United States Patent
Boulay et al.

(10) Patent No.: US 6,880,881 B1
(45) Date of Patent: Apr. 19, 2005

(54) SUPPORT STRUCTURE OF A MOTOR VEHICLE

(75) Inventors: Olivier Boulay, Stuttgart (DE); Wolfgang Fussnegger, Tuebingen (DE); Hans-Peter Wunderlich, Ostfildern (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/376,002

(22) Filed: Feb. 27, 2003

(30) Foreign Application Priority Data

Feb. 27, 2002 (DE) ............................... 102 08 512

(51) Int. Cl.⁷ ................................................ B60J 7/00
(52) U.S. Cl. ......................... 296/193.09; 296/203.02; 296/203.01
(58) Field of Search ..................... 296/193.09, 203.02, 296/29, 203.01, 230.04, 193.08, 187.03, 296/204, 193.06, 187.09, 193.07; 29/897.2; 276/29; 180/68.5; 362/282

(56) References Cited

U.S. PATENT DOCUMENTS

| | | | | |
|---|---|---|---|---|
| 2,662,794 A | * | 12/1953 | Alexander | 296/193.09 |
| 3,596,978 A | * | 8/1971 | Wessells et al. | 296/203.02 |
| 4,428,599 A | * | 1/1984 | Jahnle | 296/203.01 |
| 4,669,777 A | * | 6/1987 | Harasaki et al. | 296/203.02 |
| 4,750,780 A | * | 6/1988 | Harasaki et al. | 296/203.02 |
| 4,804,222 A | * | 2/1989 | Sakiyama et al. | 296/203.02 |
| 4,840,423 A | * | 6/1989 | Maekawa | 296/203.02 |
| 4,919,474 A | * | 4/1990 | Adachi et al. | 296/203.02 |
| 4,950,025 A | * | 8/1990 | Yoshii | 296/203.04 |
| 5,011,201 A | * | 4/1991 | Takahashi et al. | 296/203.02 |
| 5,562,329 A | * | 10/1996 | Srock et al. | 296/203.01 |
| 6,068,330 A | * | 5/2000 | Kasuga et al. | 296/187.09 |
| 6,099,071 A | * | 8/2000 | Kasuga et al. | 296/187.03 |
| 6,131,284 A | * | 10/2000 | Basler | 29/897.2 |
| 6,170,906 B1 | * | 1/2001 | Kasuga | 296/203.02 |
| 6,270,152 B1 | * | 8/2001 | Sato | 296/203.02 |
| 6,296,300 B1 | * | 10/2001 | Sato | 296/203.02 |
| 6,299,237 B1 | * | 10/2001 | Benz et al. | 296/203.02 |
| 6,299,240 B1 | * | 10/2001 | Schroeder et al. | 2596/203.01 |
| 6,361,102 B1 | * | 3/2002 | Han | 296/203.02 |
| 6,382,709 B1 | * | 5/2002 | Chirifu et al. | 276/29 |
| 6,398,292 B1 | * | 6/2002 | Tsuruta et al. | 296/204 |
| 6,460,918 B1 | * | 10/2002 | Sato et al. | 296/193.06 |
| 6,474,429 B1 | * | 11/2002 | Nishio | 180/68.5 |
| 6,540,286 B1 | * | 4/2003 | Takemoto et al. | 296/204 |
| 6,598,933 B1 | * | 7/2003 | Taguchi et al. | 296/203.02 |

(Continued)

FOREIGN PATENT DOCUMENTS

| | | |
|---|---|---|
| DE | 199 17 177 | 10/2000 |
| DE | 100 18 898 | 11/2000 |
| DE | 100 36 791 | 2/2002 |
| EP | 0 538 679 | 4/1993 |

(Continued)

Primary Examiner—Kiran Patel
(74) Attorney, Agent, or Firm—Kenyon & Kenyon

(57) ABSTRACT

A support structure of a motor vehicle, e.g., a passenger car, having a floor which, in the longitudinal vehicle direction, evolves into an upwardly extending end wall, and having an extension which is attached to the end wall by longitudinal members. The production of the support structure may be simplified by arranging the longitudinal members as profiles having a constant cross-section in their longitudinal direction, their longitudinal profile direction being inclined relative to the longitudinal vehicle direction.

25 Claims, 2 Drawing Sheets

U.S. PATENT DOCUMENTS 6,601,973 B1 * 8/2003 Rasmussen et al. ........ 362/282
6,666,501 B1 * 12/2003 Logan et al. .......... 296/193.07
6,705,667 B1 * 3/2004 Bartesch et al. ....... 296/203.02
6,705,670 B1 * 3/2004 Forssell et al. ........ 296/203.02

FOREIGN PATENT DOCUMENTS

EP 0 622 289 11/1994
GB 2 333 501 7/1999

* cited by examiner

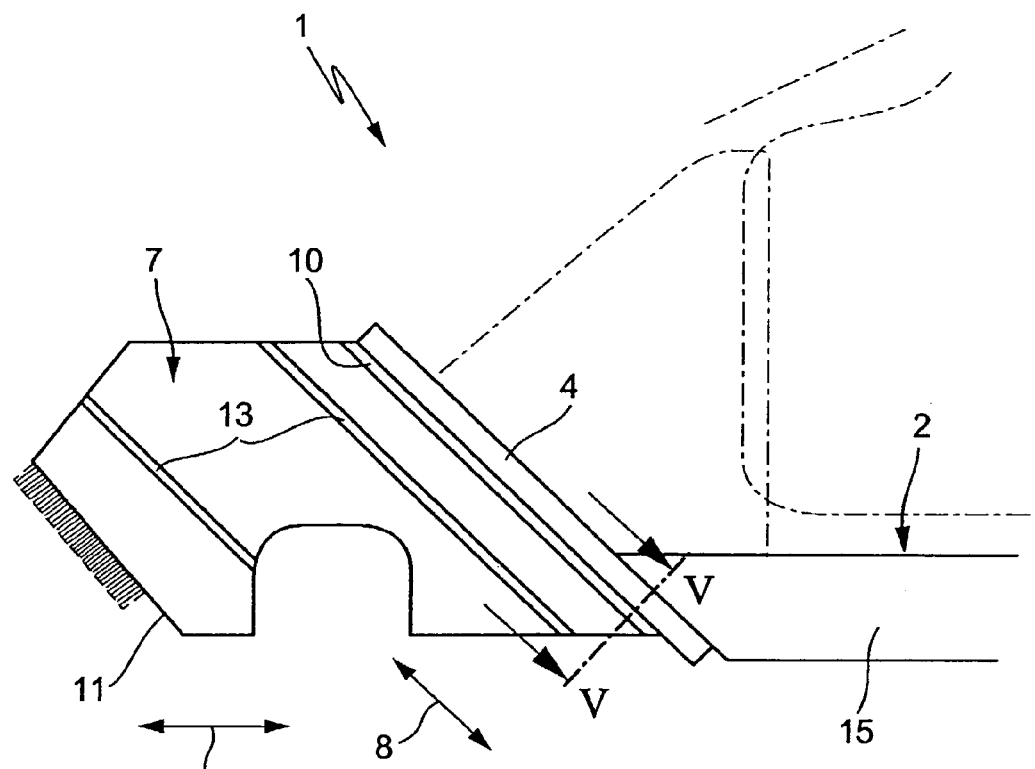
Fig. 4
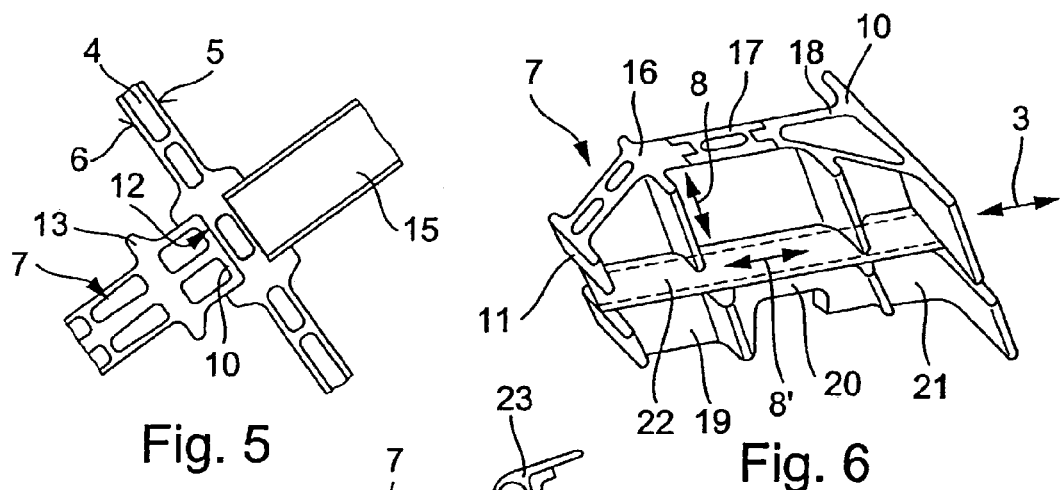
Fig. 5
Fig. 6
Fig. 7

SUPPORT STRUCTURE OF A MOTOR VEHICLE

CROSS-REFERENCE TO RELATED APPLICATIONS

The present application claims priority to Application No. 102 08 512.9, filed in the Federal Republic of Germany on Feb. 27, 2002, which is expressly incorporated herein in its entirety by reference thereto.

FIELD OF THE INVENTION

The present invention relates to a support or load-bearing structure of a motor vehicle, e.g., a passenger car.

BACKGROUND INFORMATION

A support structure of this type is described, for example, in German Published Patent Application No. 199 17 177. It has a floor that, in the forward longitudinal vehicle direction, evolves into an upwardly extending front end wall and, in the rear longitudinal vehicle direction, evolves into an upwardly extending rear end wall. The support structure also has a front extension that is attached to the front end wall by front longitudinal members. The support structure further has a rear extension that is fastened to the rear end wall by rear longitudinal members.

The design of support structures is complicated, because it is often necessary to take into account conflicting requirements. Adequate crash and endurance strength must be ensured. At the same time, the support structure must have compact external dimensions and provide a relatively large vehicle interior. In the engine compartment, in particular, the design of the support structure is especially complicated, in particular, that of the front and rear longitudinal members. The tools needed to produce the support structure are equally complicated and expensive.

A self-supporting, rigid passenger enclosure for a passenger car, which is constructed of extruded profiles, the longitudinal profile directions of which extend parallel to the longitudinal vehicle direction, is described in European Published Patent Application No. 0 538 679.

A method of designing side wall sections of a passenger enclosure in a passenger car in the form of extruded profiles, the longitudinal profile direction of which extend parallel to the longitudinal vehicle direction, is described in European Published Patent Application No. 0 622 289.

An object of the present invention is to provide an arrangement of a support structure of the type mentioned above, e.g., one that may be produced more economically.

SUMMARY

The above and other beneficial objects of the present invention may be achieved by providing a support structure as described herein.

An aspect of the present invention is based on the general concept of arranging longitudinal members as profiles having a constant cross-section in their longitudinal direction, so that their longitudinal profile direction is inclined relative to the longitudinal direction of the vehicle. This construction may allow the longitudinal members to be much more easily adjusted to the rigidity requirements of the support structure. In addition, the proposed inclination of the longitudinal profile direction relative to the longitudinal vehicle direction may simplify the attachment of the longitudinal member to the end wall and/or to the extension by shaping the profile end in a suitable manner.

The longitudinal members may be suitably arranged as extruded profiles or pultruded profiles, or rolled profiles.

An example embodiment, in which the longitudinal profile direction of each longitudinal member extends parallel to the end wall or to a connecting zone of the end wall provided on the end wall for connecting the longitudinal member, may be suitable. This may enable the profile end facing the end wall to be easily shaped, thereby simplifying the attachment of the longitudinal member to the end wall.

In another example embodiment, the longitudinal members may have an increasing width and/or an increasing wall thickness from the extension to the end wall. This example embodiment may make it possible to optimize the energy-absorbing effect of the longitudinal members in the event of a crash.

Other features and aspects of the present invention are described below with reference to the drawings, and the corresponding description of the Figures on the basis of the drawings.

The features mentioned above and explained in greater detail below may be used not only in the combination described above, but also in different combinations or even alone without going beyond the scope of the present invention.

An exemplary embodiment of the present invention is illustrated in the drawings and explained in greater detail in the following description, identical reference numbers referring to identical or similar components throughout the several views.

BRIEF DESCRIPTION OF THE DRAWINGS

FIG. 4 is a side view of the support structure according to a fourth example embodiment.

FIG. 5 is a cross-sectional view through the longitudinal member along line of intersection V illustrated in FIG. 4.

FIG. 6 is a perspective view of another example embodiment.

FIG. 7 is a cross-sectional view through an end wall according to a further example embodiment.

DETAILED DESCRIPTION

Figure 1:
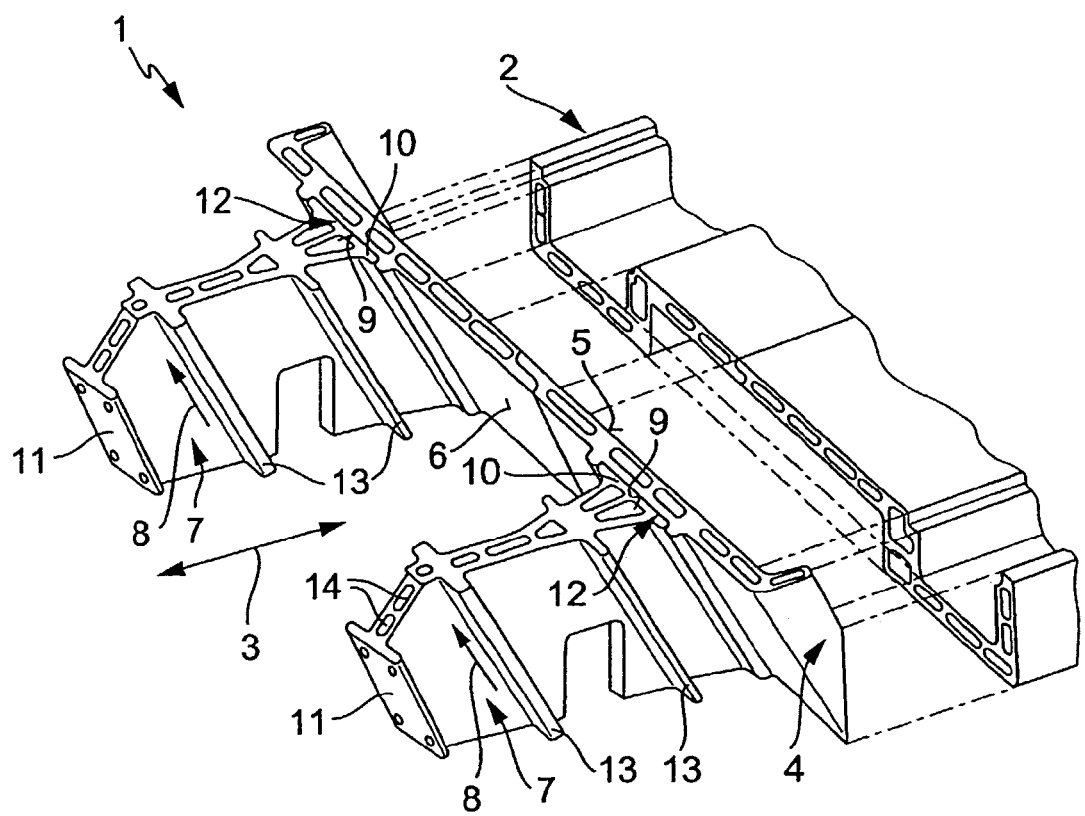
FIG. 1 is a perspective view of a section of a support structure according to an example embodiment of the present invention.

According to FIG. 1, a support structure 1 of a motor vehicle, e.g., a passenger car, has a floor 2, which may be arranged as a self-supporting floor. According to the example embodiment illustrated, floor 2 includes one or more extruded profiles, the longitudinal profile directions of which extend parallel to a longitudinal vehicle direction 3, which is represented by a double arrow. At one axial end, floor 2 evolves into an upwardly extending end wall 4 which, in this case, is mounted on floor 2 and connected thereto, for example, by weld seams. According to the example embodiment illustrated in FIG. 1, this end wall 4 also includes two extruded profiles, the longitudinal profile direction of which extends upward.

Floor 2 ordinarily supports a passenger enclosure. Therefore, end wall 4 has an inside 5 facing floor 2 and an outside 6 facing away from floor 2. On this outside 6, two longitudinal members 7 that extend in longitudinal vehicle direction 3 are attached to end wall 4. With the help of these longitudinal members 7, an extension is attachable to end wall 4 and thus to floor 2.

According to the example embodiments illustrated, end wall 4 is a front end wall 4 that is mounted on the front end of floor 2 relative to the direction of vehicle travel. A front extension, e.g., a front end, is supported on end wall 4 by front longitudinal members 7. In the case of support structure 1, however, a rear end wall 4 to which a rear extension, e.g., a rear end, is attached by rear longitudinal members 7, may be additionally or alternatively provided in the same manner at the rear end relative to the direction of vehicle travel.

According to an aspect of the present invention, longitudinal members 7 are arranged as profiles that have a constant cross-section in the longitudinal profile direction represented by an arrow 8. Longitudinal profile direction 8 of each longitudinal member 7 is inclined relative to longitudinal vehicle direction 3 even though longitudinal vehicle direction 3 is the main extension direction of longitudinal members 7. The main extension direction in this case is the direction in which the extension of longitudinal members 7 is the longest, i.e., longitudinal vehicle direction 3 in this case.

As illustrated in FIG. 1, longitudinal members 7 are shaped such that their longitudinal profile direction 8 is on a plane that extends in longitudinal vehicle direction 3 and in the elevation direction of corresponding longitudinal member 7, i.e., in particular vertically. Longitudinal profile directions 8 therefore extend from bottom to top or vice-versa. According to an example embodiment illustrated, longitudinal profile directions 8 extend parallel to end wall 4. For the purpose of connecting each longitudinal member 7, end wall 4 may have connecting zones 9, each of which extends parallel to longitudinal profile direction 8 of corresponding longitudinal member 7. Angles between 60 and 90 degrees may be suitable for the inclination of longitudinal profile direction 8 relative to longitudinal vehicle direction 3.

Each longitudinal member 7 has a profile end 10 that faces end wall 4 and is also referred to below as rear profile end 10. Each longitudinal member 7 also has a profile end 11 that faces away from end wall 4 and is also referred to below as front profile end 11. In this case, profile ends 10 and 11 are each arranged as mounting plates that are each provided with a flat outside. In the area of connecting zones 9, end wall 4 is provided with a connecting flange 12, which is designed to match rear profile end 10. The extension is also provided with a connecting flange that is arranged to match front profile end 11. As illustrated in FIG. 1, connecting flange 12 of end wall 4 may also be arranged as a groove provided on outside 6, into which mounting plate 10, i.e., rear profile end 10, is insertable and secured therein via a lateral positive fit manner. Longitudinal members 7 are attachable to end wall 4 in a conventional manner, e.g., by gluing, soldering, welding, screwing and/or riveting, etc.

Due to the flat outside of rear profile end 10, a relatively large area of the latter, i.e., the mounting plate formed by it, is able to rest on end wall 4. An example embodiment in which the mounting plate formed by profile end 10 is arranged to be wider in the vehicle transverse direction than the adjacent sections of longitudinal member 7, may be provided.

Figure 2:
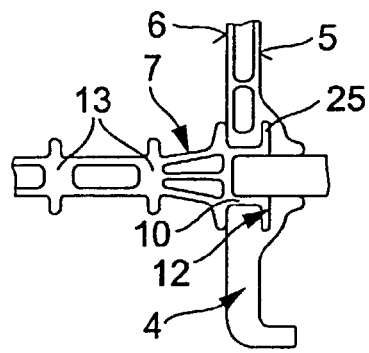
FIG. 2 is a cross-sectional view through a longitudinal member according to a second example embodiment.

As illustrated in FIG. 2, both connecting flange 12 of end wall 4 and the groove may be provided with an undercut 25 in which matching profile end 10 of longitudinal member 7 is insertable only in the longitudinal direction of the groove or in the coinciding longitudinal profile direction 8. Particularly in longitudinal vehicle direction 3, and at right angles thereto, this may result in an effective positive fit connection between longitudinal member 7 and end wall 4. Thus, mounting plate 10 and corresponding connecting flange 12 form a tongue-and-groove system.

As illustrated in FIG. 1, longitudinal members 7 each have at least one, in this case two, mounting strips 13 that extend outwardly at right angles to longitudinal vehicle direction 3 on either side of corresponding longitudinal member 7. These mounting strips 13 may be integrated into the profile of longitudinal members 7 as continuous bars. This means that the profile may be arranged as a solid profile in the area of mounting strips 13. These mounting strips 13 are used, for example, to connect axle and/or suspension components of one vehicle axle and/or to connect or carry steering components, etc.

An example embodiment according to the present invention, in which longitudinal members 7 are arranged as profiles, may make it easy to arrange longitudinal members 7 so that, in longitudinal vehicle direction 3, from end wall 4 to the extension, they have a decreasing width, measured at right angles to longitudinal vehicle direction 3, and/or a decreasing wall thickness. A failure characteristic that has been optimized for crash situations may be used for longitudinal members 7.

As illustrated in the Figures, the profiles of longitudinal members 7 may have one or more cavities or chambers 14, making longitudinal members 7 easy to manufacture.

Figure 3:
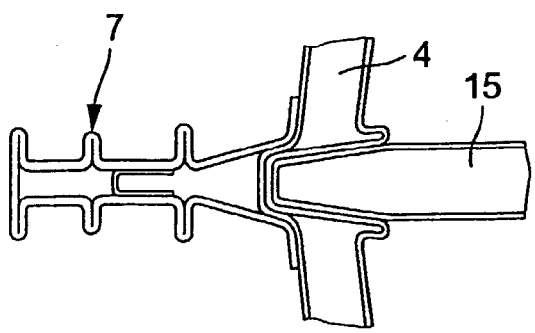
FIG. 3 is a cross-sectional view through a longitudinal member according to a third example embodiment.

FIG. 3 illustrates an exemplary embodiment in which longitudinal members 7 are arranged as rolled profiles. In the other example embodiments, longitudinal members 7 are arranged as extruded profiles or pultruded profiles. Profiles of these types may be comparatively economical to produce.

FIG. 4 illustrates another example embodiment in which end wall 4 and longitudinal profile directions 8 are inclined approximately 45 degrees relative to longitudinal vehicle direction 3. Varying the inclination may make it possible to optimize the vehicle's crash performance.

In example embodiments 3 to 5, longitudinal members 7 are positioned at right angles to longitudinal vehicle axis 3 on the outside of end wall 4 so that they are flush with longitudinal members 15, which are supported on end wall 4 on inside 5 of end wall 4. These longitudinal members 15 are lateral longitudinal members 15 of floor 2, which, in the door area, are also referred to as sillboards. This flush alignment may make it possible to directly transmit force from longitudinal members 7 of the extension to lateral longitudinal members 15 of floor 2 in the event of a crash.

In the example embodiment illustrated in FIG. 6, longitudinal members 7 may be constructed of multiple profile sections 16, 17, 18, 19, 20, 21, 22. This may make it possible to select smaller wall thicknesses for individual smaller profile sections 16 through 22. At the same time, the extrusion speed of an extrusion process may be increased, allowing individual profile sections 16 through 22 to be produced more economically than may be possible with a single large profile. In addition, a longitudinal member 7 manufactured in this manner may make it possible to position profile sections 16 through 22 such that longitudinal profile axes 8 of at least two adjacent profile sections 16 through 22 are offset relative to one another, e.g., by 45 to 90 degrees.

What is claimed is:

1. A support structure of a motor vehicle, comprising:
a floor;
an upwardly extending front end wall arranged in a forward longitudinal vehicle direction of the floor; and
a front extension attached to the front end wall by front longitudinal members, the longitudinal members extending substantially along the forward longitudinal vehicle direction, the longitudinal members including profiles having a constant cross-section in a longitudinal profile direction thereof inclined relative to the longitudinal vehicle direction.

2. The support structure according to claim 1, wherein the motor vehicle includes a passenger car.

3. The support structure according to claim 1, wherein the longitudinal members include one of extruded profiles, pultruded profiles and rolled profiles.

4. The support structure according to claim 1, wherein the longitudinal profile direction of one of the longitudinal members is arranged in a plane that is defined by the longitudinal vehicle direction and an elevation direction of the one of the longitudinal members.

5. The support structure according to claim 1, wherein the longitudinal profile direction of each longitudinal member extends parallel to one of the end wall and a connecting zone of the end wall provided on the end wall and configured to connect to a corresponding longitudinal member.

6. The support structure according to claim 1, wherein the longitudinal profile direction is inclined approximately 60 to 90 degrees relative to the longitudinal vehicle direction.

7. The support structure according to claim 1, wherein at least one of a first profile end facing the end wall and a second profile end facing away from the end wall includes a mounting plate.

8. The support structure according to claim 7, wherein at least one of the end wall and the extension includes a connecting flange that matches the mounting plate.

9. The support structure according to claim 8, wherein the mounting plate and the corresponding connecting flange include a tongue-and-groove system.

10. The support structure according to claim 9, wherein a relatively large area of the mounting plate of the longitudinal member and associated with the end wall is supported on the end wall.

11. The support structure according to claim 10, wherein the mounting plate is wider than sections of the longitudinal member adjacent thereto.

12. The support structure according to claim 8, wherein the mounting plate and the associated connecting flange are arranged as insertable connections, a direction of insertion of which is parallel to the longitudinal profile direction of the corresponding longitudinal member.

13. The support structure according to claim 1, wherein the longitudinal member includes at least one of an increasing width and an increasing wall thickness from the extension to the end wall.

14. The support structure according to claim 1, wherein the profiles include at least one chamber.

15. The support structure according to claim 1, wherein the floor includes lateral longitudinal members supported on an inside of the end wall, the longitudinal members of the extension positioned on the end wall supported on an outside of the end wall in an area of the lateral longitudinal members of the floor.

16. The support structure according to claim 1, wherein the longitudinal members include at least one externally projecting mounting strip integrated into the profile as a continuous web.

17. The support structure according to claim 1, wherein the end wall includes multiple sections.

18. The support structure according to claim 17, wherein the end wall is divided at right angles to the longitudinal vehicle direction and includes an external shell facing the extension and an inner shell facing away from the extension.

19. The support structure according to claim 18, wherein the external shell of the end wall is attached to a pre-assembled extension, the internal shell of the end wall is attached to a pre-assembled passenger enclosure that includes the floor, and the end wall is configured to be assembled by attaching the extension to the passenger enclosure.

20. The support structure according to claim 1, wherein the end wall is arranged as one of a one-part and a multi-part profile including a constant cross-section in a longitudinal direction thereof, the longitudinal profile direction arranged at right angles to the longitudinal vehicle direction and horizontally.

21. The support structure according to claim 1, wherein the longitudinal member includes multiple profile sections.

22. The support structure according to claim 21, wherein the longitudinal profile directions of at least two adjacent profile sections are inclined relative to one another.

23. The support structure according to claim 21, wherein the longitudinal profile directions of at least two adjacent profile sections are inclined relative to one another by 45 to 90 degrees.

24. The support structure according to claim 1, further comprising:
an upwardly extending rear wall arranged in a rear longitudinal vehicle direction of the floor; and
a rear extension attached to the rear end wall by rear longitudinal members, the rear longitudinal members including profiles having a constant cross-section in a longitudinal profile direction thereof inclined relative to the longitudinal vehicle direction.

25. A support structure of a motor vehicle, comprising:
a floor;
at least one of a front end wall arranged in a forward longitudinal vehicle direction of the floor and a rear end wall arranged in a rear longitudinal vehicle direction of the floor; and
at least one of a front extension attached to the front end wall by front longitudinal members and a rear extension attached to the rear end wall by rear longitudinal members;
wherein the longitudinal members include profiles having a constant cross-section in a longitudinal profile direction thereof inclined relative to the longitudinal vehicle direction.

* * * * *